United States Patent
Jeong et al.

(10) Patent No.: US 11,196,122 B2
(45) Date of Patent: Dec. 7, 2021

(54) BATTERY MODULE AND BATTERY PACK INCLUDING THE SAME

(71) Applicant: LG Chem, Ltd., Seoul (KR)

(72) Inventors: Woo Seung Jeong, Daejeon (KR); Young Bum Cho, Daejeon (KR); Youngho Jung, Daejeon (KR); Cheol Yung Kim, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/851,837

(22) Filed: Apr. 17, 2020

(65) Prior Publication Data

US 2020/0403196 A1 Dec. 24, 2020

(30) Foreign Application Priority Data

Jun. 21, 2019 (KR) ........................ 10-2019-0074429

(51) Int. Cl.
*H01M 50/209* (2021.01)
*H01M 50/20* (2021.01)

(52) U.S. Cl.
CPC ......... *H01M 50/209* (2021.01); *H01M 50/20* (2021.01)

(58) Field of Classification Search
CPC ..... H01M 50/20; H01M 50/209; H01M 50/11
See application file for complete search history.

(56) References Cited

U.S. PATENT DOCUMENTS

| | | | | |
|---|---|---|---|---|
| 2007/0202401 A1* | 8/2007 | Viavattine | ............... | H01M 6/14 429/209 |
| 2010/0187027 A1* | 7/2010 | Komaki | ............... | H01M 50/20 180/65.21 |
| 2012/0171527 A1* | 7/2012 | Hiroma | ............... | H01M 50/209 429/61 |
| 2015/0311485 A1* | 10/2015 | Fister | ............... | H01M 10/0413 429/151 |
| 2016/0268564 A1 | 9/2016 | Cho et al. | | |
| 2018/0294535 A1 | 10/2018 | Choi et al. | | |
| 2018/0331336 A1* | 11/2018 | Choi | ............... | H01M 10/625 |
| 2018/0375077 A1 | 12/2018 | Shin et al. | | |
| 2019/0148802 A1 | 5/2019 | Lim et al. | | |

FOREIGN PATENT DOCUMENTS

| | | |
|---|---|---|
| JP | 5131055 B2 | 1/2013 |
| JP | 2015207541 A | 11/2015 |
| KR | 20160109423 A | 9/2016 |
| KR | 20170029283 A | 3/2017 |
| KR | 20170135479 A | 12/2017 |
| KR | 20180020547 A | 2/2018 |
| KR | 20180071800 A | 6/2018 |
| KR | 20190054300 A | 5/2019 |

* cited by examiner

*Primary Examiner* — Kenneth J Douyette
(74) *Attorney, Agent, or Firm* — Lerner, David, Littenberg, Krumholz & Mentlik, LLP

(57) ABSTRACT

A battery module includes a battery cell stack in which a plurality of battery cells are stacked; a plate disposed to contact the plurality of battery cells on a side surface of the battery cell stack and disposed in a direction parallel to a stacking direction of the plurality of battery cells included in the battery cell stack; and an adhesive layer applied to the plate to contact the battery cell stack and the plate. A battery pack can include the battery module.

15 Claims, 5 Drawing Sheets

Prior Art

BATTERY MODULE AND BATTERY PACK INCLUDING THE SAME

CROSS-REFERENCE TO RELATED APPLICATION

This application claims priority to and the benefit of Korean Patent Application No. 10-2019-0074429 filed in the Korean Intellectual Property Office on Jun. 21, 2019, the entire contents of which are incorporated herein by reference.

BACKGROUND OF THE INVENTION

(a) Field of the Invention

The present invention relates to a battery module and a battery pack including the same, and more particularly, to a battery module including a thermal conductive pad and a battery pack including the same.

(b) Description of the Related Art

A secondary battery has attracted a great deal of attention as an energy source in various products such as a mobile device and an electric vehicle. The secondary battery is a strong energy source that may replace use of existing products that use fossil fuels, and is being highlighted as an environmentally friendly energy source because no by-products are generated according to energy use.

Recently, as needs for a large-capacity secondary battery structure along with use of the secondary battery as an energy storage source is increasing, there is an increasing demand for a battery pack having a multi-module structure in which a battery module in which a plurality of secondary batteries are connected in series/parallel is assembled in plural.

Meanwhile, when configuring a battery pack by connecting a plurality of battery cells in series/parallel, a method of configuring a battery module consisting of at least one battery cell and then configuring a battery pack by adding other components to at least one battery module is generally used.

The battery module is provided with a plate under a frame in which a battery cell stack is accommodated to fix the plurality of battery cells to the frame, protect the battery cells from external shocks, and at the same time, discharge heat generated from the battery cells by using thermal conductivity.

FIG. 1 illustrates a cross-sectional view of a conventional battery cell and plate.

Referring to FIG. 1, a conventional battery module includes a plurality of battery cells 10 and a plate 20 contacting the plurality of battery cells under the plurality of battery cells. In the conventional art, since hardness of the plate 20 is high, when the plurality of battery cells 10 formed asymmetrically are stacked, a flat surface of the plate 20 is not in close contact with an irregular surface formed on side surfaces of the stacked battery cells, and thus a non-contact area S occurs between the battery cell 10 stack and the plate.

When such a non-contact area S occurs, since the battery cell disposed in the non-contact area is not fixed to the plate, physical defects may occur from external impact, and since a predetermined air layer is formed between the battery cell and the plate, heat resistance due to the air layer is increased, and an ambient temperature is increased due to the increased heat resistance, thereby degrading performance of the battery module.

The above information disclosed in this Background section is only for enhancement of understanding of the background of the invention, and therefore it may contain information that does not form the prior art that is already known in this country to a person of ordinary skill in the art.

SUMMARY OF THE INVENTION

The present invention has been made in an effort to provide a battery module and a battery pack including the same that may improve contact performance between the plurality of battery cells and the plate.

The objects of the present invention are not limited to the objects mentioned above, and other objects not mentioned can be clearly understood by those skilled in the art from the description below.

An embodiment of the present invention provides a battery module and a battery pack including the same, wherein the battery module includes: a battery cell stack in which a plurality of battery cells are stacked; a plate disposed to contact the plurality of battery cells on a side surface of the battery cell stack and disposed in a direction parallel to a stacking direction of the plurality of battery cells included in the battery cell stack; and an adhesive layer applied to the plate to contact the battery cell stack and the plate.

The plate may be made of a thermal interface material.

The plate may be made of a soft material, and the adhesive layer may be made of a thermally conductive adhesive.

The battery module may further include a frame that fixes the plate and accommodates the battery cell stack. The frame may include an upper frame covering an upper side of the battery cell stack, and a lower frame covering both lateral sides and a lower side of the battery cell stack.

A thickness of each battery cell of the plurality of battery cells may become thicker toward a location in which the plate is disposed.

A battery cell adhesive may be inserted between adjacent battery cells of the plurality of battery cells, and the plurality of battery cells may be bonded to each other by the battery cell adhesive.

The plate may be formed to correspond to a side shape of the battery cell stack.

According to the battery module and the battery pack including the same according to the embodiment of the present invention, a plate is in close contact with a plurality of battery cells through a soft plate and an adhesive layer applied to the plate, thus it is possible to fix the plurality of battery cells to the plate to enhance durability, and it is possible to maintain heat generation inside the battery module at an appropriate level by reducing thermal resistance between the battery cell and the plate.

The effects of the present invention are not limited to the effects mentioned above, and other effects not mentioned can be clearly understood by those skilled in the art from the description of the claims.

DETAILED DESCRIPTION OF THE EMBODIMENTS

Embodiments described below are exemplarily illustrated for understanding of the invention, and it should be understood that the present invention may be modified in various ways to be different from the embodiments described herein. However, in the description of the present invention, the detailed description and illustration of related well-known functions or constituent elements will be omitted when it is determined as unnecessarily making the scope of the present invention unclear. In addition, the accompanying drawings may be exaggerated in dimensions of some of the components rather than drawn to scale for understanding of the present invention.

The terms "first", "second", etc. used in the present application may be used to describe various constituent elements, but the constituent elements should not be limited to the terms. The terms should be used only for differentiating one constituent element from another constituent element.

The terms used in the specification are used to describe only specific embodiments and are not intended to limit the scope of the present invention. Singular forms are intended to include plural forms unless the context clearly indicates otherwise. In the present application, it should be understood that the term "include", "comprise", "have", or "configure" indicates that a feature, a number, a step, an operation, a component, a part, or a combination thereof described in the specification is present, but does not exclude a possibility of presence or addition of one or more other features, numbers, steps, operations, components, parts, or combinations, in advance.

Hereinafter, a battery module according to an embodiment of the present invention will be described with reference to FIG. 2 to FIG. 5.

Figure 1:
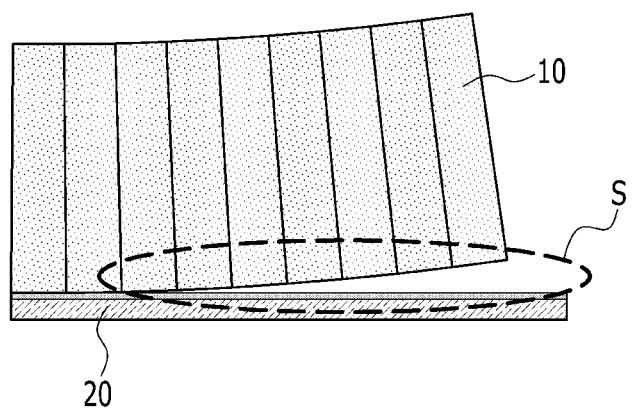
FIG. 1 illustrates a cross-sectional view of a conventional battery cell and plate.
Figure 2:
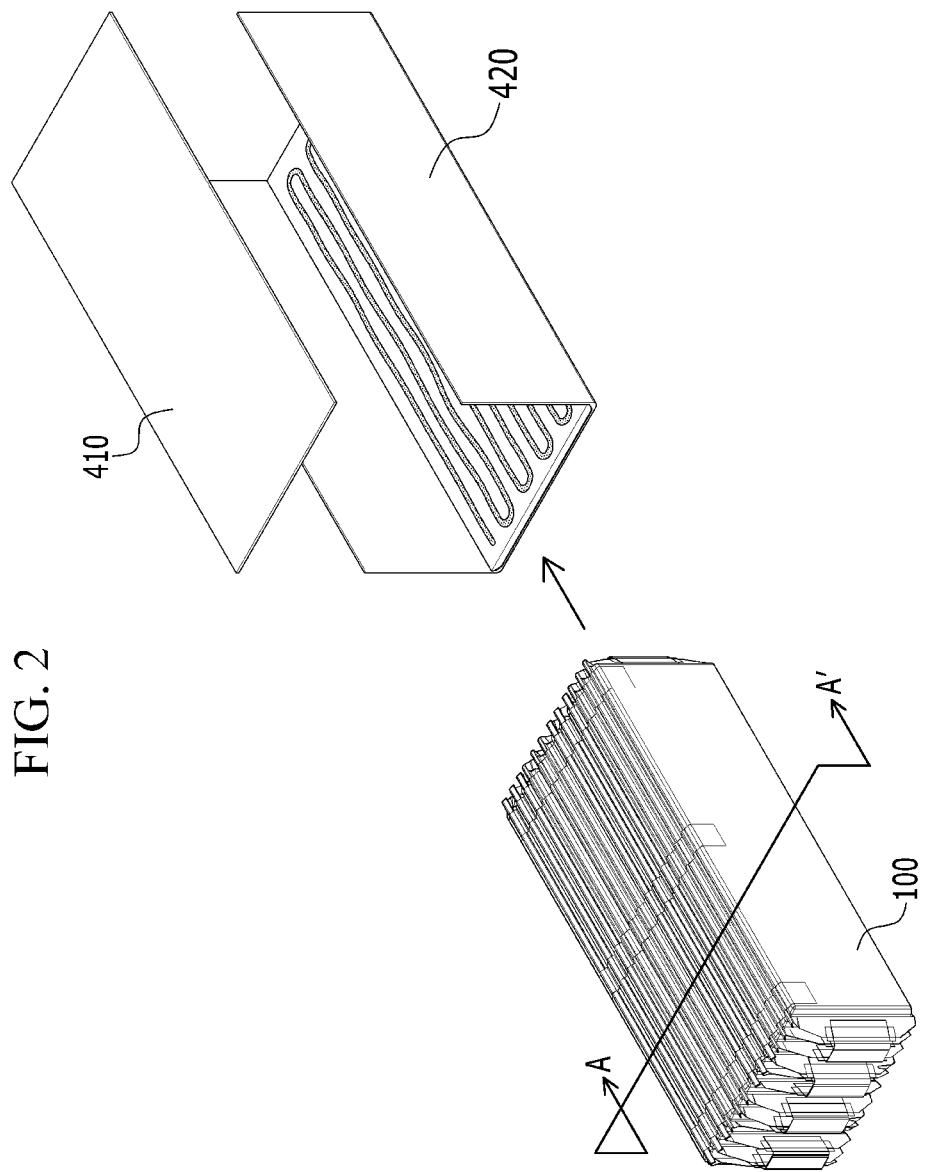
FIG. 2 illustrates a perspective view of a battery cell stack, a frame, a plate, and an adhesive layer applied thereto according to an embodiment of the present invention.
Figure 3:
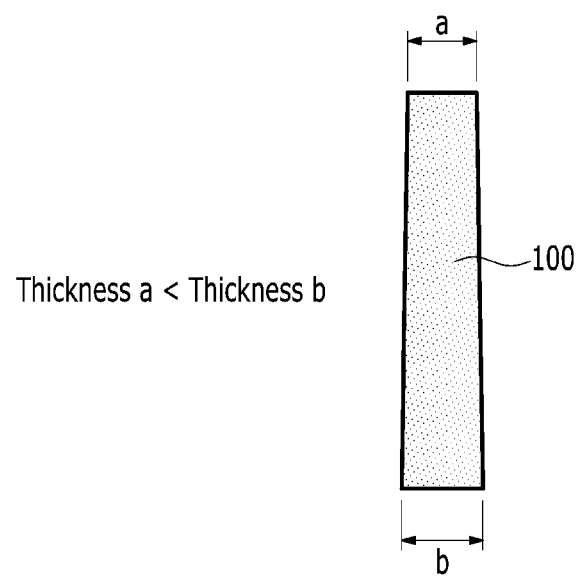
FIG. 3 illustrates a thickness of a battery cell according to an embodiment of the present invention.
Figure 4:
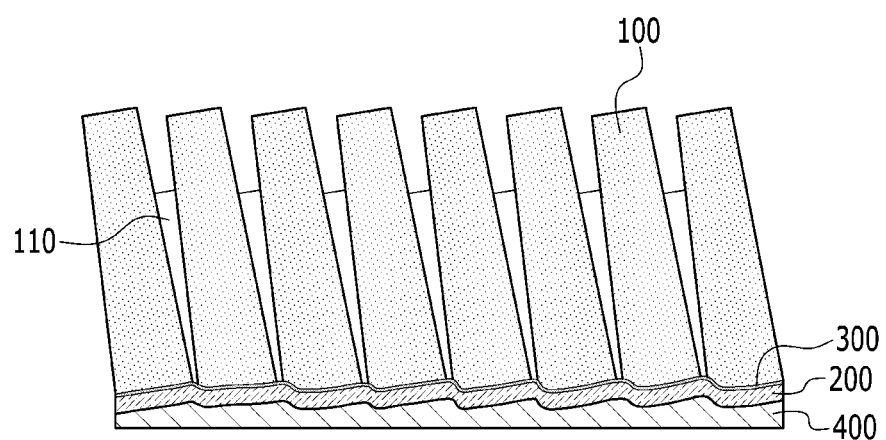
FIG. 4 illustrates a cross-sectional view of an arrangement structure of battery cell stacked bodies, and a plate and an adhesive layer in contact therewith, which correspond to a portion A-A' of FIG. 2.
Figure 5:
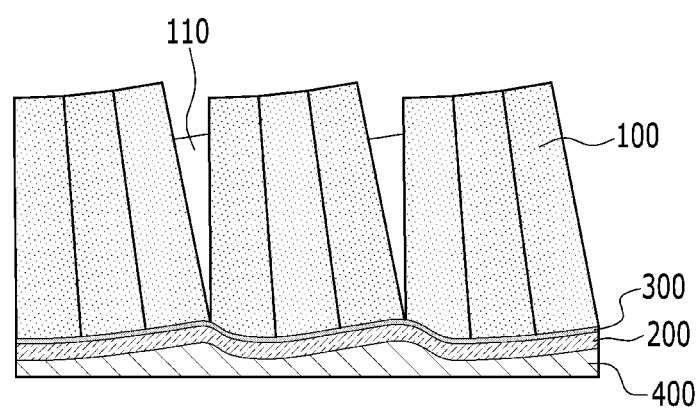
FIG. 5 illustrates a cross-sectional view of another arrangement structure of battery cell stacked bodies, and a plate and an adhesive layer in contact therewith, which correspond to the portion A-A' of FIG. 2.

FIG. 2 illustrates a perspective view of a battery cell stack, a frame, a plate, and an adhesive layer applied thereto according to an embodiment of the present invention. FIG. 3 illustrates a thickness of a battery cell according to an embodiment of the present invention. FIG. 4 illustrates a cross-sectional view of an arrangement of battery cell stacked bodies, and a plate and an adhesive layer in contact therewith, which correspond to a portion A-A' of FIG. 2. FIG. 5 illustrates a cross-sectional view of another arrangement structure of battery cell stacked bodies, and a plate and an adhesive layer in contact therewith, which correspond to the portion A-A' of FIG. 2.

Referring to FIG. 2 to FIG. 5, the battery module according to the embodiment of the present invention includes: a battery cell stack in which a plurality of battery cells 100 are stacked; a plate 200 disposed to be in contact with the plurality of battery cells on a side surface of the battery cell stack disposed in a direction parallel to a stacking direction of the plurality of battery cells included in the battery cell stack; and an adhesive layer 300 applied to the plate 200 so that the battery cell stack and the plate closely contact each other, wherein the plate 200 on which the adhesive layer 300 is formed may be accommodated in a frame 400. The frame 400 may include an upper frame 410 covering an upper side of the battery cell stack, and a lower frame 420 covering both lateral sides and a lower side of the battery cell stack.

The battery cell 100 is a secondary battery, and it may be configured as a pouch-type secondary battery. A plurality of battery cells 100 may be configured, and the plurality of battery cells 100 may be stacked on each other to be electrically connected to each other to form the battery cell stack. A battery cell adhesive 110 may be inserted between adjacent battery cells of the plurality of battery cells 100, and the plurality of battery cells of the battery cell stack may be bonded to each other through the battery cell adhesive 110.

In the battery cell 100 according to the embodiment of the present invention, a thickness (b) of a lower side of the battery cell at a location in which the plate 200 is disposed may be thicker than a thickness (a) of an upper side of the battery cell away from the plate 200, as shown in FIG. 3. More specifically, a thickness of the battery cell 100 may be thicker toward the location in which the plate 200 is disposed.

The plate 200 according to the embodiment of the present invention may be formed of a thermal interface material (TIM). Therefore, heat generated in the battery cell 100 may be transmitted to a cooling member (not shown) through the plate 200. The cooling member may discharge the transmitted heat to the outside to adjust a temperature of the battery cell to an appropriate level.

In the conventional art, a plate having high thermal conductivity was used to easily discharge heat generated from a battery cell. However, when the plurality of battery cells 100 according to the embodiment of the present invention are stacked, it may be difficult to stack the battery cells in a vertical direction due to a difference in thickness between upper and lower ends of the battery cells, thus a side end line of the battery cells may be irregularly formed, and in this case, when a conventional plate having high thermal conductivity is used, the plate itself is not easily bent due to high hardness of the plate, thus a non-contact area between the battery cells and the plate may occur.

In addition, as described above, when the contact characteristic between the battery cell and the plate is degraded, there is a problem in that thermal resistance due to the formation of an air layer in the non-contact area increases.

Therefore, the plate 200 according to the embodiment of the present invention is formed of a soft material such as aluminum, and even though the side surfaces of the battery cell stack form irregular surfaces by stacking the plurality of battery cells 100 having different thicknesses of the upper and lower ends thereof, the plate 200 is formed to correspond to a side shape of the battery cell stack having the irregular side surfaces, thus it is possible to improve the contact characteristic between the battery cell 100 and the plate 200, thereby reducing the thermal resistance thereof.

In addition, according to the embodiment of the present invention, in order to enhance the contact characteristic between the side surfaces of the plurality of battery cells 100 and the plate 200, the adhesive layer 300 may be formed on the upper surface of the plate 200. Therefore, the battery cell stack may be safely disposed on the upper surface of the plate 200 on which the adhesive layer 300 is formed, such that the plate 200 and the battery cell stack may be more closely contacted with each other without the non-contact area through the adhesive layer 300.

Since the adhesive layer 300 is made of a thermally conductive adhesive, the adhesive layer 300 applied to the plate 200 may be hardened while closely contacting the battery cell 100 and the plate 200, and may increase thermal conductivity efficiency of heat generated from the battery cell 100. According to the embodiment of the present invention, the adhesive layer 300 may be made of a urethane-based thermal conductive adhesive.

FIG. 4 and FIG. 5 illustrate a contact shape with a plate according to a stacked form in a battery cell stack according to an embodiment of the present invention. Due to the difference in thickness between the upper and lower ends of the plurality of battery cells, the plurality of battery cells may be separately disposed as shown in FIG. 4, or several smaller stacks of the plurality of battery cells disposed together may be formed as shown in FIG. 5. In addition, although not shown in the drawings, not all of the battery cells may be separated, and stacks of the battery cells and individual battery cells may coexist.

According to the embodiment of the present invention, the soft plate 200 such as the plate 200 illustrated in FIG. 4 and FIG. 5 may fluidly correspond to and closely contact the lower surfaces of the plurality of battery cells according to a shape of a side surface thereof that may be formed under the plurality of battery cells. In this regard, a surface of plate 200 facing the plurality of battery cells can be non-planar, which is depicted in the cross-sectional view of FIG. 4 and FIG. 5 as a non-linear upper surface of plate 200. A lower surface of plate 200 facing away from the plurality of battery cells can be planar or can also be non-planar as shown in FIG. 4 and FIG. 5. The upper surface of lower frame 420 facing plate 200 can also be non-planar to match the contour of plate 200. Since plate 200 is made of a soft material such as aluminum, plate 200 can be formed into its non-planar shape during assembly of the battery module. The upper surface of lower frame 420 can be pre-formed into the non-planar shape or can be a soft material such as aluminum that can also be formed during assembly. Thus, the shape of the upper surface of lower frame 420 can be modified according to the shape of plate 200. Plate 200 can yield to the battery cells 100 so that the battery module is secure. One example of the non-planar surface is a wavy surface as shown in FIG. 4 and FIG. 5. In addition, the adhesive layer 300 may be formed on the upper side of the plate 200 to enhance the contact characteristic between the plate 200 and the battery cell 100.

The battery module described above may be included in a battery pack. The battery pack may have a structure in which one or more battery modules according to the present embodiment are assembled and packed with a battery management system (BMS) and a cooling device for managing a temperature or voltage of the battery.

The battery pack can be applied to various devices. The device may be applied to a vehicle such as an electric bicycle, an electric vehicle, or a hybrid vehicle, but the present invention is not limited thereto, and may be applied to various devices that can use a battery module, and this is also included in the scope of the present invention.

In the foregoing description, the embodiments of the present invention have been illustrated and described, but the present invention is not limited to the specific embodiments, and it will be apparent to those skilled in the art that various modifications and variations may be made without departing from the spirit or scope of the invention, and thus, it is intended that the present invention covers the modifications and variations of this invention provided they come within the scope of the appended claims and their equivalents.

DESCRIPTION OF SYMBOLS

100: battery cell
200: plate
300: adhesive layer
400: frame
410: upper frame
420: lower frame

What is claimed is:

1. A battery module comprising:
a battery cell stack in which a plurality of battery cells are stacked; and
a plate including an adhesive layer applied to the plate to contact the plurality of battery cells on an entire side surface of the battery cell stack and disposed in a direction parallel to a stacking direction of the plurality of battery cells included in the battery cell stack,
wherein a thickness of each battery cell of the plurality of battery cells is thicker toward a location in which the plate is disposed.

2. The battery module of claim 1, wherein
the plate is made of a thermal interface material.

3. The battery module of claim 1, wherein
the plate is made of a soft material.

4. The battery module of claim 1, wherein
the adhesive layer is made of a thermally conductive adhesive.

5. The battery module of claim 1, further comprising
a frame that fixes the plate and accommodates the battery cell stack.

6. The battery module of claim 5, wherein
the frame includes an upper frame covering an upper side of the battery cell stack, and
a lower frame covering both lateral sides and a lower side of the battery cell stack.

7. The battery module of claim 1, wherein
a battery cell adhesive is inserted between adjacent battery cells of the plurality of battery cells, and the plurality of battery cells are bonded to each other by the battery cell adhesive.

8. The battery module of claim 1, wherein
the plate is formed to correspond to a side shape of the battery cell stack.

9. A battery pack including the battery module according to claim 1.

10. The battery module of claim 1, wherein
a surface of the plate facing the plurality of battery cells is non-planar.

11. The battery module of claim 10, wherein
the non-planar surface is a wavy surface.

12. The battery module of claim 10, wherein
a lower surface of the plate facing away from the plurality of battery cells is non-planar.

13. The battery module of claim 10, wherein
a lower surface of the plate facing away from the plurality of battery cells is planar.

14. The battery module of claim 12, further comprising
a frame that fixes the plate and accommodates the battery cell stack, wherein
the frame includes an upper frame covering an upper side of the battery cell stack, and
a lower frame covering both lateral sides and a lower side of the battery cell stack, such that an upper surface of a lower frame facing the plate is non-planar to match a contour of the plate.

15. The battery module of claim 1, wherein the plate is made of aluminum.

* * * * *